(12) United States Patent
De Vriendt et al.

(10) Patent No.: US 10,907,488 B2
(45) Date of Patent: Feb. 2, 2021

(54) ICEPHOBIC VANE FOR A COMPRESSOR OF AN AXIAL TURBINE ENGINE

(71) Applicant: SAFRAN AERO BOOSTERS SA, Herstal (BE)

(72) Inventors: Olivier De Vriendt, Bassenge (BE); Nicolas Raimarckers, Tourinne (BE)

(73) Assignee: SAFRAN AERO BOOSTERS SA, Herstal (BE)

( * ) Notice: Subject to any disclaimer, the term of this patent is extended or adjusted under 35 U.S.C. 154(b) by 52 days.

(21) Appl. No.: 16/469,789

(22) PCT Filed: Nov. 8, 2017

(86) PCT No.: PCT/EP2017/078603
§ 371 (c)(1),
(2) Date: Jun. 14, 2019

(87) PCT Pub. No.: WO2018/108393
PCT Pub. Date: Jun. 21, 2018

(65) Prior Publication Data
US 2020/0080433 A1    Mar. 12, 2020

(30) Foreign Application Priority Data

Dec. 15, 2016   (BE) .................................. 2016/5937

(51) Int. Cl.
*F01D 9/04*    (2006.01)
*F01D 25/02*   (2006.01)

(52) U.S. Cl.
CPC ............ *F01D 9/041* (2013.01); *F01D 25/02* (2013.01); *F05D 2220/323* (2013.01); *F05D 2240/121* (2013.01); *F05D 2300/512* (2013.01)

(58) Field of Classification Search
CPC .......... F01D 5/286; F01D 5/288; F01D 9/041; F01D 25/02; F05D 2220/323; F05D 2220/36; F05D 2240/303; F05D 2240/121; F05D 2240/31; F05D 2250/62; F05D 2250/621; F05D 2250/63; F05D 2300/512; F05D 2300/437
See application file for complete search history.

(56) References Cited

U.S. PATENT DOCUMENTS 10,252,807 B2 *  4/2019  Wilson, Jr. .............. B64D 29/00
2005/0008495 A1 *  1/2005  Wobben .................. B08B 17/06
                                                          416/241 R
(Continued)

FOREIGN PATENT DOCUMENTS

WO      2013022467 A2    2/2013

OTHER PUBLICATIONS

Search Report dated Feb. 14, 2018 for Parent PCT Appl. No. PCT/EP2017/078603.

*Primary Examiner* — Igor Kershteyn
(74) *Attorney, Agent, or Firm* — James E. Walton

(57) ABSTRACT

The invention relates to an anti-icing turbomachine blade (26), in particular for a low-pressure compressor or an intermediate-pressure compressor of a turbomachine. The blade (26) has a leading edge (28) formed by an ice-phobic surface (40) and two hydrophobic surfaces (42; 44) which extend the ice-phobic surface (40) on the pressure side (32) and the suction side (34) to allow water droplets escaping from the leading edge (28) to flow.

19 Claims, 3 Drawing Sheets

(56) References Cited

U.S. PATENT DOCUMENTS

| | | |
|---|---|---|
| 2007/0031639 A1* | 2/2007 | Hsu .................. C25D 11/04 |
| | | 428/141 |
| 2010/0279084 A1* | 11/2010 | Biris ................ B81C 1/00206 |
| | | 428/196 |
| 2011/0089604 A1* | 4/2011 | Hulseman ............... B23H 9/00 |
| | | 264/219 |
| 2011/0147219 A1 | 6/2011 | Lambourne et al. |
| 2011/0151186 A1* | 6/2011 | Lambourne .......... C09D 183/08 |
| | | 428/141 |
| 2013/0032646 A1 | 2/2013 | Dhiman et al. |
| 2013/0236322 A1 | 9/2013 | Schmidt et al. |

* cited by examiner

ICEPHOBIC VANE FOR A COMPRESSOR OF AN AXIAL TURBINE ENGINE

TECHNICAL FIELD

The invention relates to the field of turbine engine vanes subject to icing. More specifically, the invention relates to a vane having a surface provided against frost in a turbine engine. The invention also relates to an axial turbine engine, in particular an aircraft turbojet engine or an aircraft turboprop engine equipped with such an anti-icing vane.

BACKGROUND ART

During a flight, a multitude of vanes of the turbine engine may be subject to icing phenomenon. In these conditions, a negative temperature combined with a humidity of the air results in a frost deposit that gradually thickens the vane surfaces. Therefore, the aerodynamic shape of the vanes is no longer maintained, and the operating safety of the turbine engine suffers. In order to limit the aforementioned phenomenon, the surfaces at the vane leading edge may be of the icephobic type.

Such icephobic surfaces have physical properties limiting the presence of frost or ice; in particular by limiting the solidification of water droplets condensing therein, by repelling the water droplets, and having a reduced ice/vane adhesion. It should be noted that the frost build-up process is also influenced by the turbulences produced by the leading edge of the vane. Indeed, the leading edge is a place of deceleration and acceleration of the flow, which in particular affects its pressure and therefore the temperature of change of state.

Document US 2013/0236322 A1 discloses a turbojet engine with a fan. The fan comprises a vane with a leading edge that is subject to the icing phenomenon during operation of the turbojet engine. The leading edge has a surface modified at the nanoscale to counteract the presence of frost. However, such an arrangement still shows a build-up of frost on the vane.

SUMMARY OF THE INVENTION

Technical Problem

The aim of the invention is to solve at least one of the problems posed by the prior art. More specifically, the invention aims to reduce the accumulation of ice on a vane. The invention also aims to provide a simple solution, resistant, lightweight, economical, reliable, easy to produce, of convenient maintenance, of easy inspection, and of improved performance.

Technical Solution

The subject of the invention is a turbine engine anti-ice vane, in particular for a turbine engine compressor, the vane Comprising a leading edge, a trailing edge, an intrados face, an extrados face, and an icephobic surface forming the leading edge of the vane wherein a hydrophobic surface extends from the icephobic surface towards the trailing edge.

According to advantageous embodiments, the vane may comprise one or more of the following features, taken separately or according to all the possible technical combinations:

The hydrophobic surface is an extrados hydrophobic surface.

The hydrophobic surface is a hydrophobic surface intrados.

The extrados hydrophobic surface extends further downstream than the intrados hydrophobic surface.

The icephobic surface extends more on the extrados side than on the intrados side.

The icephobic surface extends over more than half of the thickness E of the vane.

The icephobic surface has a maximum shear stress with ice that is less than or equal to the limit shear stress of each hydrophobic surface with ice, preferably at least two times smaller, or at least ten times lower.

The vane comprises a free downstream half, void of hydrophobic surface and/or void of icephobic surface.

The vane comprises an area forming the trailing edge whose roughness is greater than the roughness of the hydrophobic surface, the zone being in particular arranged at a distance and upstream of said trailing edge.

The icephobic surface includes nanoreliefs, including nano-pillars and/or nano-cones.

The icephobic surface has a pattern with a micro roughness on which nanoreliefs are formed, especially nano-pillars and/or nano-cones.

The or each hydrophobic surface has an arithmetic average roughness (Ra) of less than or equal to: 0.60 μm, or 0.10 μm.

The or each hydrophobic surface comprises furrows shapes, including micro-furrows.

The furrows are connected by bulges or micro-bulges.

The icephobic surface touches the or each hydrophobic surface of the vane.

The vane is made of a metal alloy, including a titanium alloy and/or an aluminum alloy.

The icephobic surface comprises an anodized coating and/or a polymer coating which can be plasma deposited.

The extrados side comprises a zone free of hydrophobic surface downstream of the hydrophobic surface.

The intrados face comprises a zone free of hydrophobic surface downstream of its hydrophobic surface.

The coating is a nano coating.

The bulges and/or micro-bulges have forms of cylinder portions.

The pattern with the micro-roughness of the icephobic surface extends over at least one or on each hydrophobic surface.

The vane is monobloc and/or integral.

The icephobic surface has a maximum ice shear stress of less than or equal to 500 kPa, or 150 kPa, or 15.6 kPa. The maximum shear stress may be a maximum adhesion stress between the icephobic surface and the ice when the ice moves off the surface.

The or each hydrophobic surface is free of additional nanorelief.

The or each junction between the icephobic surface and the hydrophobic surfaces extends essentially radially.

The icephobic surface is formed by a ribbon applied to the leading edge.

The invention also relates to a turbine engine anti-icing vane, in particular for a turbine engine compressor, the vane comprising a leading edge, a trailing edge, an intrados face with a hydrophobic surface, an extrados face with a hydrophobic surface; and an icephobic surface that overlaps the leading edge and connects the hydrophobic surfaces to one another.

The subject of the invention is also a compressor, in particular a low-pressure compressor, comprising several annular rows of vanes, one of which is an upstream row and one or more downstream rows, which is remarkable in that at least one vane or several vanes of the same row or each vane of the same row is/are in accordance with the embodiments disclosed above, optionally said one or more said vanes according to the embodiments disclosed above form an upstream row or a downstream row of the compressor.

According to an advantageous embodiment of the invention, each row of the compressor comprises one or more vanes according to an embodiment disclosed above.

The subject of the invention is also a turbine engine, in particular a turbojet, comprising several annular rows of vanes and/or a compressor, which is remarkable in that at least one vane or several vanes or each vane of the same annular row is are in accordance with the embodiments disclosed above; and/or the compressor is in accordance with the embodiments disclosed above.

In general, the advantageous embodiments of each object of the invention are also applicable to the other embodiments of the invention. Each object of the invention is combinable with other objects, and the objects of the invention are also combinable with the embodiments of the description, which in addition are combinable with each other, according to all possible technical combinations.

Benefits Brought

The invention optimizes the cost and the reduction of the presence of frost on a vane. It allows the evacuation of the water droplets after they have met the leading edge by sliding against the hydrophobic surfaces through the training by the primary flow. In this, the invention limits the presence of frost on a vane in the case where a droplet of water remains liquid after its meeting with the icephobic surface of the vane. Therefore, the operational safety and reliability of the turbojet engine is preserved.

DETAILED DESCRIPTION OF A PREFERRED EMBODIMENT

In the following description, the terms "internal" and "external" refer to a positioning relative to the axis of rotation of an axial turbine engine. The axial direction corresponds to the direction along the axis of rotation of the turbine engine. The radial direction is perpendicular to the axis of rotation. Upstream and downstream are in reference to the main flow direction of the flow in the turbine engine. The roughness Ra corresponds to the average arithmetic deviation from the mean line of a profile.

Figure 1:
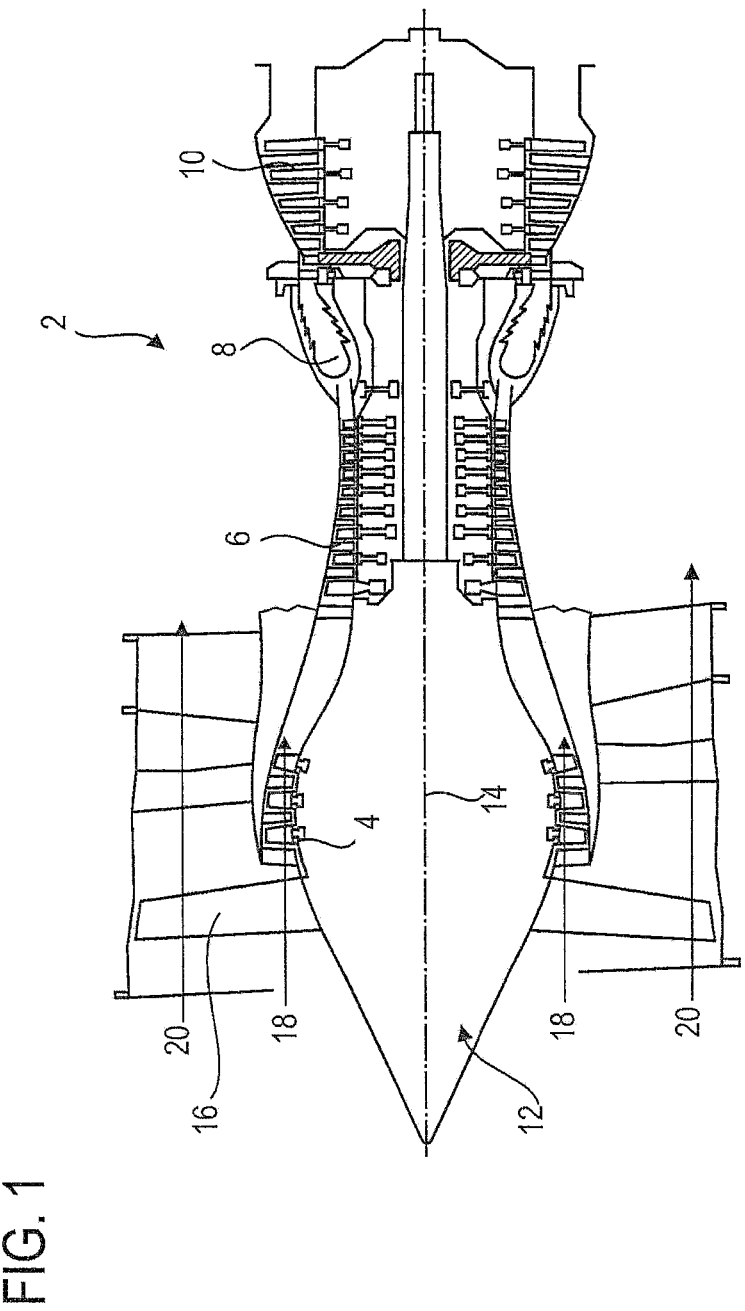
FIG. 1 represents an axial turbine engine according to the invention.

FIG. 1 is a simplified representation of an axial turbine engine 2. In this case, it is a double-flow turbojet engine. The turbojet engine 2 comprises a first compression stage, called a low-pressure compressor 4, a second compression stage, called a high-pressure compressor 6, a combustion chamber 8 and one or more stages of turbines 10. In operation, the mechanical power of the turbine 10 is transmitted via the central shaft to the rotor 12 which set in motion the two compressors 4 and 6. The latter comprise several rows of rotor vanes associated with rows of stator vanes. The rotation of the rotor about its axis of rotation 14 thus makes it possible to generate an air flow and to compress it progressively until it reaches the combustion chamber 8.

An inlet fan 16 is coupled to the rotor 12 and generates an air flow which splits into a primary flow 18 passing through the various levels mentioned above of the turbine engine, and into a secondary flow 20 passing through an annular duct (partially shown) along the engine to then join the primary flow at the turbine outlet.

The fan can be of the non-ducted type, for example with double counter-rotating impellers. The secondary flow can be accelerated to generate a thrust reaction. The primary 18 and secondary 20 flows are coaxial annular flows and are fitted into one another.

Figure 2:
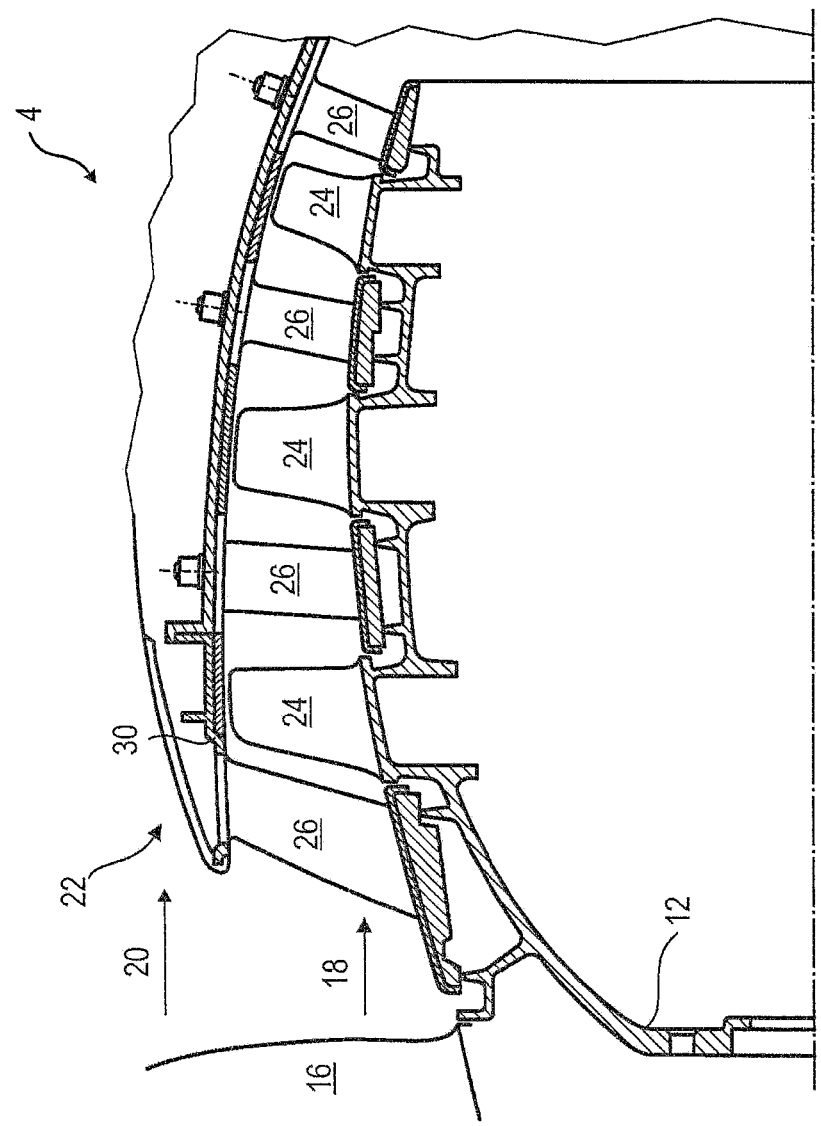
FIG. 2 is a diagram of a turbine engine compressor according to the invention.

FIG. 2 is a cross section view of a compressor of an axial turbine engine such as that of FIG. 1. The compressor can be a low-pressure compressor 4. There can be seen a portion of the fan 16 and the nozzle of separation 22 of the primary flow 18 and the secondary flow 20. The rotor 12 comprises several rows of rotor vanes 24, in this case three. It may be a one-piece bladed drum, or include dovetail vanes.

The low-pressure compressor 4 comprises several rectifiers, in this case four, each containing a row of stator vanes 26. The rectifiers are associated with the fan 16 or a row of rotor vanes to straighten the flow of air, so as to convert the speed of the flow into pressure, in particular into static pressure.

Within the same row, the stator vanes 26 are regularly spaced from each other, and may have the same angular orientation in the flow. Advantageously, the vanes of the same row are identical. Optionally, the spacing between the vanes may vary locally as well as their angular orientations. Some vanes may differ from the rest of the vanes in their row. The housing may be formed of several rings, or half-shells. At least one or each row of vanes (24; 26) of the compressor comprises at least fifty or at least eighty vanes.

At least one row of vanes (24; 26) of the compressor comprises icephobic vanes, each with an icephobic leading edge extended downstream by a hydrophobic surface on the intrados surface and/or the extrados surface. The row in question may be the row upstream, either at the inlet and in the separation nozzle 22 of the compressor 4. Or, the row may be placed downstream of the compressor 4. Optionally, the majority or all the rows of vanes compressor include icephobic vanes as presented above.

Figure 3:
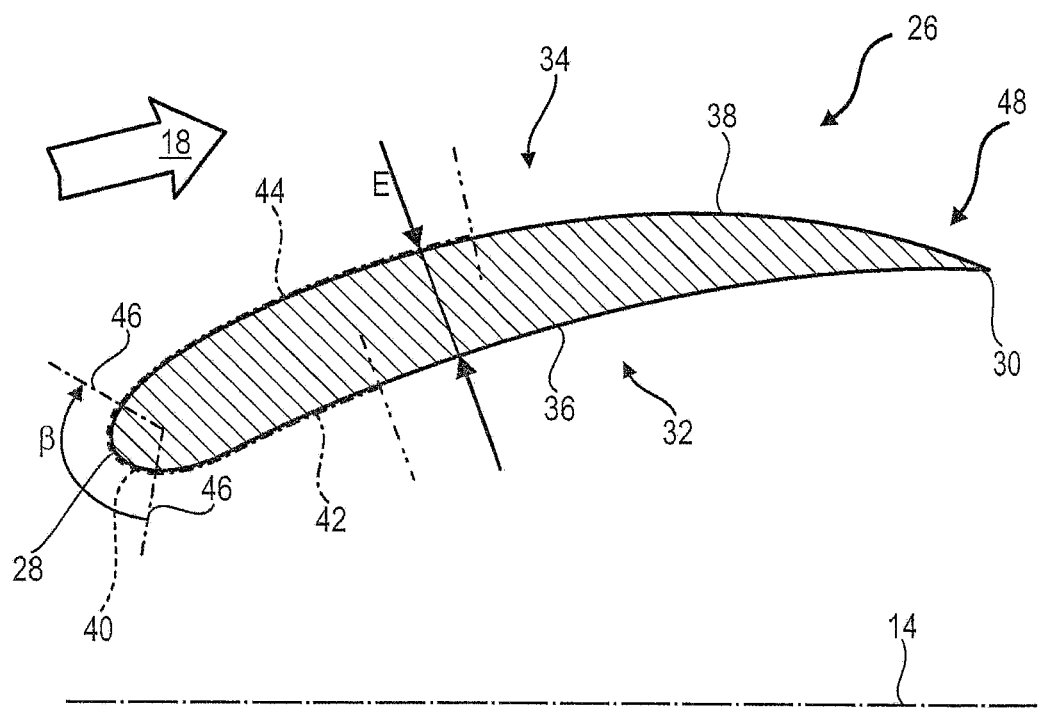
FIG. 3 illustrates a compressor vane profile of the invention.

FIG. 3 shows an aerodynamic profile of a vane 26 of the compressor as shown in FIG. 2. The vane 26 may be an icephobic vane as presented above. The present teaching is here detailed in relation to a stator vane, but it could also be applied to a rotor vane of the compressor, or to a vane of a fan. The axis of rotation 14 is shown as a reference.

The vane 26 has a stack of evolving aerodynamic profiles. This aerodynamic profile may be representative of the stack. On the present aerodynamic profile, the vane 26 shows a leading edge 28 and a trailing edge 30 at the junction of the intrados side 32 and the extrados side 34. The intrados side 32 comprises a concave intrados surface 36 while the extrados side 34 includes an extrados surface 38 convex.

The leading edge 28 may be substantially rounded. According to an alternative embodiment, it may be a projecting line. It may be more rounded than the trailing edge 30 which is optionally formed by a projecting ridge. The vane 26 comprises an icephobic surface 40 which at least partially forms its leading edge 28, for example over its entire radial height. The icephobic surface 40 has a geometry with features intrinsically limiting the presence of frost. This result can be achieved passively energetically. The icephobic surface 40 is present on at most: 15%, or 10% or 5% or 3% of the length of the vane 26, said length being measured along the chord line of the vane 26. The chord line extends from the leading edge 28 to the trailing edge 30. It can be a medium chord line in space. The icephobic surface 40 may extend over at least 25% or 50% or 75% of the thickness E of the vane 26. The thickness E may be the maximum thickness of the vane 26. Thus, the icephobic surface 40 forms the upstream face of vane 26.

In addition, the vane 26 comprises hydrophobic surfaces (42; 44), including a hydrophobic intrados surface 42 and an extrados hydrophobic surface 44. Their roughness Ra may be less than or equal to 0.60 μm. Axially, the hydrophobic surfaces (42; 44) partially cover their respective surface (36; 38). They may in particular be present in the upstream half, the downstream half possibly being free of hydrophobic surface.

The icephobic surface 40 exhibits a maximum shear stress with ice that is at least fifteen times less than the maximum shear stress of each hydrophobic surface (42; 44) with ice. Therefore, ice adheres fifteen times better on each hydrophobic surface than on icephobic surface 40.

The icephobic surface 40 and the hydrophobic surfaces (42; 44) have common boundaries. They contact each other at junctions 46 with continuity of surface or coating. The junctions 46 delimiting the icephobic surface 40 form between them an angle βgreater than or equal to: 45°, or 60°, or 90°, or 120°. The junctions 46 may be perpendicular to the icephobic surface 40.

Towards the trailing edge 30, the vane 26 has a zone 48 with an increase in the roughness Ra, which may in particular exceed 1.00 μm. This increase may correspond to the end of each hydrophobic surface (42; 44). On the other hand, the extrados hydrophobic surface 44 can continue further downstream than the intrados hydrophobic surface 42. These hydrophobic surfaces can be positioned where the greatest deviation of the primary flow 18 occurs.

Figure 4:
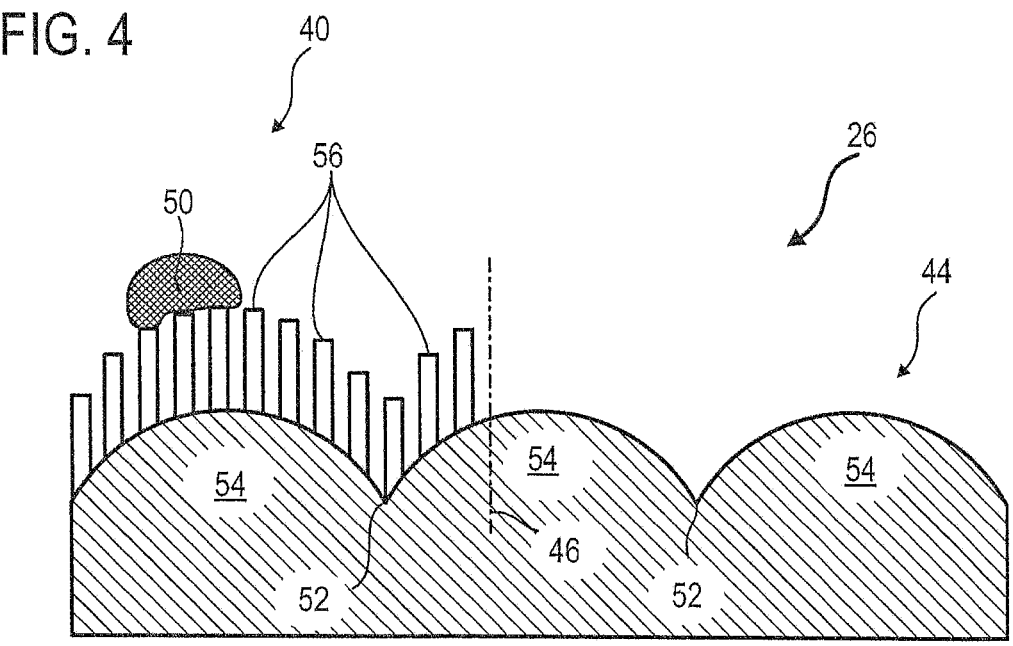
FIG. 4 details a junction between a hydrophobic surface and the icephobic surface according to the invention.

FIG. 4 represents a portion of a vane 26 surface, for example an extrados side 34, at the junction 46 between the icephobic surface 40 and the extrados hydrophobic surface 44.

Each hydrophobic surface 44 extends the icephobic surface 40. These surfaces are touching, especially over the entire height of the icephobic surface 40 and/or the vane 26. Thus, the water droplets 50 come into contact with the icephobic surface 40 without solidifying, that is to say without freezing, then escape by sliding against the hydrophobic surface extrados 44. In this movement, they are pushed by the primary flow. To allow this evacuation, each hydrophobic surface may comprise micro furrows 52 connected by micro bulges 54. This set contributes to the design of the microroughness of the hydrophobic surfaces. Other forms of microroughness can be made without departing from the scope of the invention.

The icephobic surface comprises a rough surface with an anodized coating and/or a polymer coating. This coating can be applied by plasma. It may be a tape or ribbon stuck to the body of vane. It can be made from a nanopowder, possibly inorganic. It may be a PP-HMDSO coating. The icephobic surface may comprise a specific nanoroughness. This nanoroughness can be formed by nanopillars 56 and/or nano-cones. For example, the nanoroughness can be laser cut in a nanolayer, in particular a polymeric or metallic nanoshell.

Furthermore, the nanoreliefs can be formed on the same frame, that is to say the same microroughness as the hydrophobic surfaces.

The invention claimed is:

1. A vane for a turbine engine, the vane comprising:
   a trailing edge;
   an icephobic surface forming a leading edge of the vane; and
   a hydrophobic surface extends from the icephobic surface towards the trailing edge.

2. The vane according to claim 1, wherein the hydrophobic surface is an extrados hydrophobic surface.

3. The vane according to claim 1, wherein the hydrophobic surface is an intrados hydrophobic surface.

4. The vane according to claim 1, wherein the hydrophobic surface is an extrados hydrophobic surface;
   wherein the hydrophobic surface is an intrados hydrophobic surface; and
   wherein the extrados hydrophobic surface extends axially more than the intrados hydrophobic surface.

5. The vane according to claim 4, wherein the icephobic surface connects the extrados hydrophobic surface to the intrados hydrophobic surface.

6. The vane according to claim 1, further comprising:
   an extrados side and an intrados side;
   wherein the icephobic surface extends more on the extrados side than on the intrados side.

7. The vane according to claim 1, wherein the icephobic surface extends over more than half of the thickness of the vane.

8. The vane according to claim 1, wherein the vane comprises:
   a zone upstream of the trailing edge, the zone having a roughness, and the hydrophobic surface having a roughness;
   wherein the roughness of the zone is greater than the roughness of the hydrophobic surface.

9. The vane according to claim 1, wherein the icephobic surface comprises:
   nano-reliefs, such as nano-pillars and/or nano-cones.

10. The vane according to claim 1, wherein the hydrophobic surface has a center line average roughness of less than 0.10 μm.

11. The vane according to claim 1, wherein the hydrophobic surface comprises furrows.

12. The vane according to claim 11, wherein the furrows are connected by bulges.

13. The vane according to claim 1, wherein the icephobic surface contacts the hydrophobic surface.

14. The vane according to claim 1, wherein the vane is made of titanium or aluminum alloy.

15. The vane according to claim 1, wherein the icephobic surface comprises:
   an anodized coating and/or a polymer coating.

16. A vane for a turbine engine, the vane comprising:
   a trailing edge;
   an icephobic surface forming a leading edge of the vane; and
   a hydrophobic surface;
   wherein the icephobic surface has a maximal sheer stress with ice and the hydrophobic surface has a maximal sheer stress with ice, and wherein the maximal sheer stress with ice of the icephobic surface is lower than the maximal sheer stress with ice of the hydrophobic surface.

17. The vane according to claim 16, wherein the maximal sheer stress with ice of the icephobic surface is below two times less than the maximal sheer stress with ice of the hydrophobic surface.

18. The vane according to claim 16, wherein the maximal sheer stress with ice of the icephobic surface is below ten times less than the maximal sheer stress with ice of the hydrophobic surface.

19. A vane for a turbine engine, the vane comprising:
   a trailing edge;
   an icephobic surface forming a leading edge of the vane; and
   a hydrophobic surface;
   wherein the vane is void of hydrophobic surface at least in a downstream half of the vane.

* * * * *